United States Patent Office 3,290,114
Patented Dec. 6, 1966

3,290,114
PROCESS FOR THE PREPARATION OF POTASSIUM FLUOBORATE
Simha Harel, Kiryat Motzkin, Georg Stern, Haifa, and Charles Chaim Klein, Acco, Israel, assignors to Chemical & Phosphates Limited, a company of Israel
No Drawing. Filed Feb. 27, 1963, Ser. No. 261,475
Claims priority, application Israel, May 15, 1962, 17,293
14 Claims. (Cl. 23—59)

Alkali metal fluoborates have important known industrial uses, especially in metallurgical processes such as, for example, as grain refiners in the production of aluminium and magnesium and for the introduction of boron as an alloying component into metals such as aluminium.

The invention has the object to provide a simple process for the preparation of potassium fluoborate. It is based on the new observation that in an aqueous system containing an alkali metal fluoride or ammonium fluoride as well as boric acid, acidulation with a mineral acid converts the anions present into the anion $BF_4$, and potassium fluoborate precipitates from this system if potassium cations are either present therein at the time of the acidulation or added to the acidulated system.

The invention, therefore, consists in a process for the preparation of potassium fluoborate, wherein an aqueous dispersion of an alkali metal fluoride or ammonium fluoride and boric acid is acidulated with a mineral acid and potassium fluoborate is precipitated from the acidulated dispersion.

The alkali metal fluoride used as a starting material may be, for example, sodium or potassium fluoride. Where potassium fluoride is used as a starting material, potassium fluoborate precipitates upon acidulation of the reaction mixture. If the fluoride used as a starting material is the sodium or ammonium salt, a potassium compound other than the fluoride, e.g. the readily available chloride, will be added to the reaction mixture before or after the acidulation.

In a preferred embodiment of the invention, a mixture of potassium fluoride and ammonium fluoride, prepared by the decomposition of potassium fluosilicate, is used as a starting material. In this manner the valuable potassium fluoborate can be produced from the comparatively cheap potassium fluosilicate. This latter compound is a by-product of industrial processes for the manufacture of phosphoric acid or phosphates from apatitic rock prosphate. Upon reaction with aqueous ammonia it is decomposed to form a precipitate of silica on the one hand, and an aqueous solution of potassium fluoride and ammonium fluoride on the other hand, according to the equation:

$$K_2SiF_6 + 4NH_4OH = 2KF + 4NH_4F + Si(OH)_4 \quad (1)$$

If this solution of potassium fluoride and ammonium fluoride is used in the manufacture of potassium fluoborate according to the invention, the process can be described by the equation:

$$4KF + 8NH_4F + 3H_3BO_3 + 9HX = 3KBF_4 + KX + 8NH_4X + 9H_2O \quad (2)$$

where X is an equivalent of mineral acid anion, e.g. $Cl^-$ or $\frac{1}{2}SO_4^=$.

According to this equation, one-quarter of the potassium present in the original reaction mixture is converted into the compound KX and is thus not utilized for the formation of potassium fluoborate. This loss can be avoided if either hydrogen fluoride or an additional amount of ammonium fluoride is added to the mixture of starting materials, in which case the reaction will proceed in accordance with either Equation 3 or Equation 4:

$$3KF + 6NH_4F + 3HF + 3H_3BO_3 + 6HX = 3KBF_4 + 6NH_4X + 9H_2O \quad (3)$$

$$3KF + 6NH_4F + 3NH_4F + 3H_3BO_3 + 9HX = 3KBF_4 + 9NH_4X + 9H_2O \quad (4)$$

In the performance of the process in accordance with Equations 2, 3 or 4, a large proportion of mineral acid is required, e.g. sulfuric or hydrochloric acid, which is virtually lost and the ammonium salt thus formed, e.g. the sulfate or chloride, is obtained in the form of a dilute aqueous solution which is of little commercial value. The consumption of acid can be decreased, and less ammonium salt be formed as a by-product, if the aqueous solution of potassium fluoride, ammonium fluoride and boric acid is subjected to a concentrating operation for the removal of some water as well as of some ammonia liberated in the course of that operation from ammonium fluoride, the solution thus concentrated is acidulated for the precipitation of potassium fluoborate and the latter precipitate is separated from the supernatant liquid. The same applies also to the case where ammonium fluoride is the only fluoride used as a starting material.

In this manner, up to two-thirds of the ammonia contained in the solution in the form of ammonium fluoride can be removed and the consumption of acid drops accordingly.

For example, if an aqueous solution containing KF, $NH_4F$ and $H_3BO_3$ substantially in the molecular ratio 4:8:3, as postulated by Equation 2 above, and having an initial fluorine concentration of 5% by weight, is concentrated by being heated to boiling under atmospheric pressure, the following relationship is empirically found to exist between the increase of the fluorine concentration and the amount of ammonia set free and evaporated, both expressed in percent, by weight of the F and $NH_3$ originally present in the solution:

| F in solution: | $NH_3$ set free |
|---|---|
| 5.56 | 0 |
| 8.04 | 47.6 |
| 14.1 | 62.1 |
| 28.2 | 67.7 |

The ammonia can be recovered and may be used, for example, for the decomposition of another portion of $K_2SiF_6$.

The invention is illustrated by the following examples to which it is not limited.

*Example 1*

An aqueous solution of potassium fluoride and ammonium fluoride in the molecular ratio $KF + 2NH_4F$, with an F content of 53 g. of F per liter, was prepared by the treatment of $K_2SiF_6$ with aqueous ammonia and separation of the supernatant potassium fluoride-ammonium fluoride solution from the precipitated silica. One liter of the solution was then admixed with 44.4 g. of boric acid, whereby the molecular ratio of potassium fluoride, ammonium fluoride and boric acid corresponding to Equation 2 was produced. The solution was then acidulated with 226 ml. of concentrated hydrochloric acid (392 g.

of HCl per liter), heated to boiling and kept at boiling temperature for 15 minutes. After cooling, the precipitated potassium fluoborate was filtered off, washed and dried and amounted to 82.6 g., which was a recovery of 94.2% of the fluorine originally present.

*Example 2*

1 liter of the same solution of KF and 2NH₄F as in Example 1 was admixed with 44.4 g. of boric acid and then concentrate to a flourine content of about 10%. Then the concentrated solution was acidulated with 110 ml. of the same concentrated hydrochloric acid as in Example 1. The precipitate of potassium fluoborate was filtered off, washed and dried and amounted to 84.7 g., corresponding to a fluorine recovery of 96.5%.

Comparison of this example with Example 1 shows that owing to the concentration of the solution before the addition of the hydrochloric acid, the required amount of the latter could be reduced to one half.

*Example 3*

The solution of potassium fluoride, ammonium fluoride and boric acid was prepared and processed as described in Example 2, but the concentration was effected to a fluorine content of about 15%, whereby the consumption of hydrochloric acid was lowered to 90 ml. The yield of potassium fluoborate was again 84.7 g.

*Example 4*

A solution of potassium fluoride, ammonium fluoride and boric acid was prepared and processed as in Example 2. For its acidulation 65 ml. of aqueous sulfuric acid (1:1) containing 62.5 g. of $H_2SO_4$ was used. The yield of potassium fluoborate was the same as in Example 2.

*Example 5*

Fluosilicic acid was reacted with aqueous ammonia in an approximate molecular ratio of 6.5 parts of $NH_3$ for each part of $H_2SiF_6$. The supernatant ammonium fluoride solution was separated from the precipitated silica and contained 89 g. of fluorine per liter. One liter of this solution was admixed with 73.5 g. of boric acid, then the solution was concentrated to half its original weight. The hot concentrated solution was admixed with 97 g. of $H_2SO_4$ of 98% (diluted with water 1:2) and with a solution of 95 g. of KCl in 280 g. of water and the mixture was cooled. Potassium fluoborate precipitated and was separated from the supernatant liquid. The yield was 124.5 g., being a 85.1% recovery of fluorine.

If the solution had not been concentrated before the addition of the sulfuric acid, the consumption of the latter would have been higher by at least 120%.

*Example 6*

Potassium fluosilicate reacted with aqueous potassium hydroxide in an approximate molecular ratio of 4 parts of KOH for each part of $K_2SiF_6$. The supernatant potassium fluoride solution was separated from the precipitated silica and contained 110 g. of fluorine per liter. 300 ml. of this solution was diluted with 200 ml. of water, then 28.0 g. of boric acid was added and the mixture was heated and acidulated with 120 ml. of the concentrated hydrochloric acid according to Example 1. The potassium fluoborate precipitate amounted to 47.7 g., corresponding to a fluorine recovery of 87.5%.

*Example 7*

84 g. of sodium fluoride and 33.5 g. of boric acid were suspended in 300 ml. of water and the suspension was heated and then admixed with 140 ml. of the concentrated hydrochloric acid of Example 1. Then a saturated aqueous solution of potassium chloride, containing 41.5 g. of KCl, was added whereby potassium fluoborate was precipitated. The precipitate amounted to 57 g., corresponding to a fluorine recovery of 90.5%.

We claim:
1. A process for the prepartion of potassium fluoborate comprising the steps of adding at least the stoichiometric amount of boric acid to a fluoride selected from the group consisting of alkali metal fluorides, ammonium fluoride and mixtures thereof, in an aqueous medium, adding sufficient strong mineral acid to the resulting aqueous mixture of boric acid and fluorides to give an acid reaction to said aqueous mixture, adding sufficient water-soluble potassium salt other than a fluoride to stoichiometrically react with the fluorine values present in said acidulated mixture and to precipitate potassium fluoborate and recover said potassium fluoborate.

2. A process for the preparation of potassium fluoborate comprising the steps of adding sufficient strong mineral acid to a mixture of boric acid and a fluoride selected from the group consisting of alkali metal fluorides, ammonium fluoride and mixtures thereof, in an aqueous medium, to give an acid reaction to the aqueous mixture, adding sufficient water-soluble potassium salt other than a fluoride to stoichiometrically react with the fluorine values present in said acidulated aqueous mixture and to precipitate potassium fluoborate and recover said potassium fluoborate.

3. The process of claim 2, wherein said fluoride and boric acid are initially present in said aqueous mixture substantially in the molecular proportion of 4:1.

4. The process of claim 2, wherein said fluoride is potassium fluoride in aqueous solution whereby no additional water-soluble potassium salt is required.

5. The process of claim 4, wherein said potassium fluoride in aqueous solution is prepared by the decomposition of potassium fluosilicate with aqueous potassium hydroxide and removal of the precipitated silica.

6. The process of claim 2 wherein said fluoride is sodium fluoride in aqueous solution.

7. The process of claim 6 wherein said added water-soluble potassium salt other than a fluoride is potassium chloride.

8. The process of claim 2 wherein said fluoride is ammonium fluoride in aqueous solution.

9. The process of claim 8 wherein said added water-soluble potassium salt other than a fluoride is potassium chloride.

10. The process of claim 2 wherein said fluoride is a mixture of potassium fluoride and ammonium fluoride in aqueous solution, prepared by the decomposition of potassium fluosilicate with aqueous ammonia and contains potassium fluoride and ammonium fluoride substantially in the molecular proportion 1:2.

11. The process of claim 10 wherein said added water-soluble potassium salt other than a fluoride is potassium chloride.

12. The process of claim 1 wherein said aqueous mixture of boric acid and fluorides contains ammonium fluoride and said aqueous mixture is concentrated before acidulating whereby a portion of said ammonium fluoride decomposes and ammonia is liberated thus reducing the amount of strong mineral acid required to give an acid reaction to said concentrated aqueous mixture.

13. The process of claim 2 wherein said fluoride is a mixture of potassium fluoride and ammonium fluoride in a molecular ratio of about 1:2 and a portion of said added strong mineral acid is hydrogen fluoride, said hydrogen fluoride being added substantially in the molecular proportion of 1:1 with respect to said potassium fluoride.

14. A process for the preparation of potassium fluoborate comprising the steps of adding sufficient strong mineral acid selected from the group consisting of hydrochloric acid and sulfuric acid to an aqueous suspension of boric acid, potassium fluoride and ammonium fluoride in the molecular ratio of about 3:4:8, to give an acid reaction to said aqueous suspension and to precipitate potassium fluoborate, and recovering said potassium fluoborate.

References Cited by the Examiner
UNITED STATES PATENTS 1,898,532   2/1933   Hardtmann et al. ____ 23—59 X
2,182,511  12/1939   Heiser _____ 23—59
3,119,654   1/1964   Cunningham _____ 23—59

MILTON WEISSMAN, *Primary Examiner.*
OSCAR R. VERTIZ, *Examiner.*
H. T. CARTER, *Assistant Examiner.*